United States Patent
Nicholas et al.

(10) Patent No.: US 11,755,518 B2
(45) Date of Patent: Sep. 12, 2023

(54) CONTROL OF THUNDERBOLT/DISPLAYPORT MULTIPLEXOR FOR DISCRETE USB-C GRAPHICS PROCESSOR

(71) Applicant: DELL PRODUCTS, LP, Round Rock, TX (US)

(72) Inventors: Ken Nicholas, Leander, TX (US); Marcin M. Nowak, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/359,853

(22) Filed: Jun. 28, 2021

(65) Prior Publication Data

US 2022/0413857 A1    Dec. 29, 2022

(51) Int. Cl.
*G06F 13/38*    (2006.01)

(52) U.S. Cl.
CPC .... *G06F 13/382* (2013.01); *G06F 2213/0042* (2013.01)

(58) Field of Classification Search
CPC .................. G06F 13/382; G06F 2213/0042
See application file for complete search history.

(56) References Cited

U.S. PATENT DOCUMENTS

| | | | |
|---|---|---|---|
| 10,331,579 B2 | 6/2019 | Gupta et al. | |
| 10,676,358 B2 | 6/2020 | Hundal et al. | |
| 2003/0208643 A1* | 11/2003 | Ferguson | G06F 3/023 710/15 |
| 2012/0159521 A1* | 6/2012 | Kriegelstein | G06F 9/44 719/327 |
| 2014/0281283 A1* | 9/2014 | Shacham | G06F 1/3275 711/149 |
| 2015/0169487 A1* | 6/2015 | Subramaniyan | G06F 3/061 710/316 |
| 2015/0278058 A1* | 10/2015 | Kurts | G06F 11/3476 714/30 |
| 2016/0357699 A1* | 12/2016 | Shamarao | G06F 13/385 |
| 2020/0233822 A1* | 7/2020 | Zheng | G06F 3/1407 |
| 2021/0311895 A1* | 10/2021 | Das Sharma | G06F 13/4221 |

* cited by examiner

*Primary Examiner* — Henry Tsai
*Assistant Examiner* — Harry Z Wang
(74) *Attorney, Agent, or Firm* — Larson Newman, LLP

(57) ABSTRACT

An information handling system includes a USB-C port, first and second processors, and a USB-C power delivery controller. The first processor couples to the USB-C port utilizing a first connection type. The second processor couples to the USB-C port utilizing a second connection type. The USB-C power delivery controller includes first registers associated with the first processor and second registers associated with the second processor. The first processor utilizes the first registers to communicate with the USB-C port. The second processor utilizes the second registers to communicate with the USB-C port.

17 Claims, 3 Drawing Sheets

CONTROL OF THUNDERBOLT/DISPLAYPORT MULTIPLEXOR FOR DISCRETE USB-C GRAPHICS PROCESSOR

FIELD OF THE DISCLOSURE

This disclosure generally relates information handling systems, and more particularly relates to providing control of a Thunderbolt/DisplayPort multiplexor for a discrete USB-C graphics processor in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a USB-C port, first and second processors, and a USB-C power delivery controller. The first processor may couple to the USB-C port utilizing a first connection type. The second processor may couple to the USB-C port utilizing a second connection type. The USB-C power delivery controller may include first registers associated with the first processor and second registers associated with the second processor. The first processor may utilize the first registers to communicate with the USB-C port. The second processor may utilize the second registers to communicate with the USB-C port.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
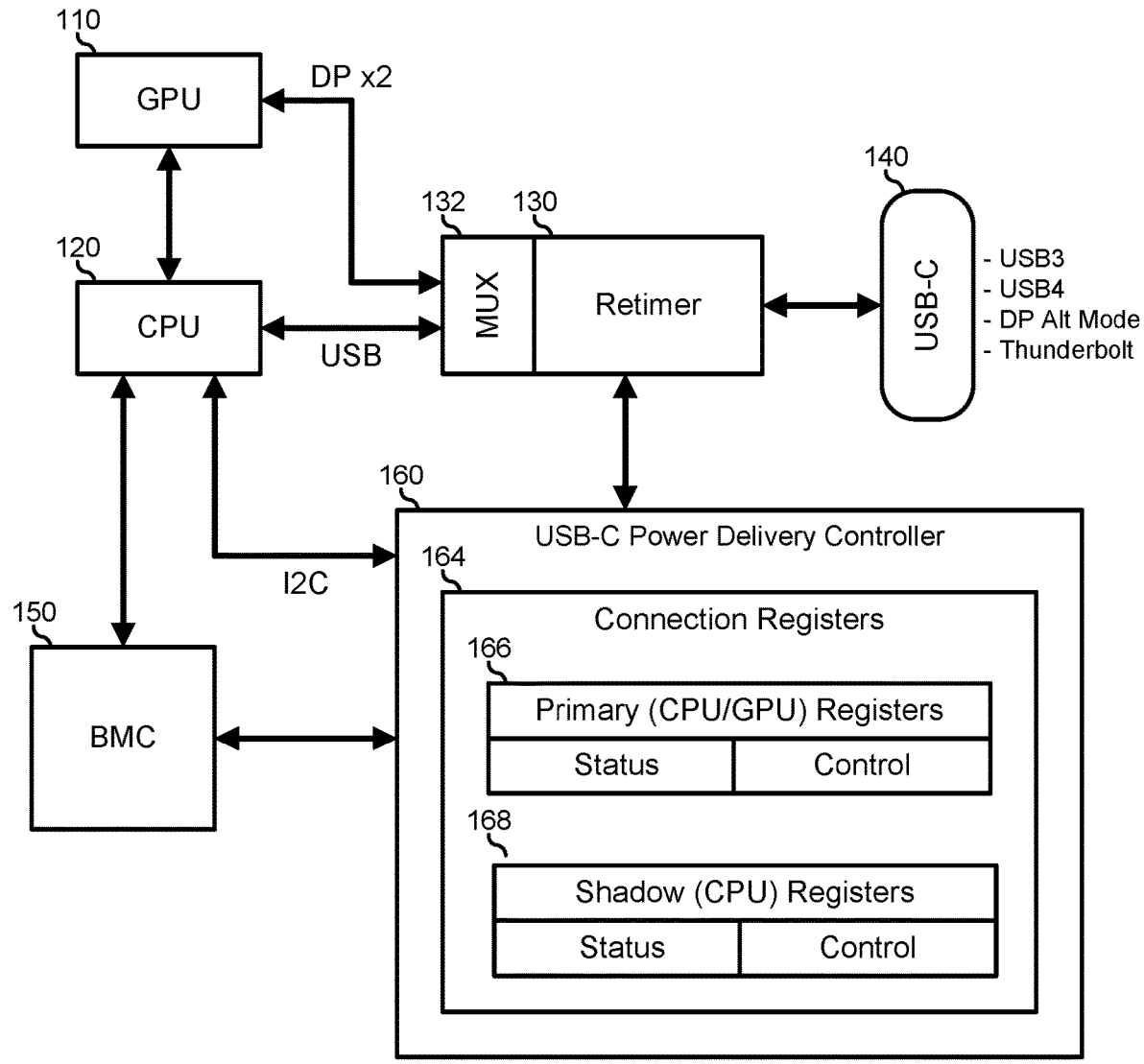
FIG. 1 is a block diagram of an information handling system according to an embodiment of the current disclosure.

FIG. 1 illustrates an information handling system 100 including a graphic processor unit (GPU) 110, a central processor unit (CPU) 120, a USB bus retimer 130, a USB-C port 140, a baseboard management controller 150, and a USB-C Power Delivery (PD) controller 160. Information handling system 100 represents various types of information handling systems, including personal computers, workstations, laptop computers, tablet devices, smartphone devices, data processing systems, or the like. GPU 110, CPU 120, retimer 130, and USB-C port 140 represent portions of a host processing system of information handling system 100 that provides the functions and features of an information handling system, such as are associated with a system BIOS/UEFI, an operating system (OS), applications and programs, and the like. As such, it will be understood that information handling system 100 may include additional elements, such as memory and data storage devices, I/O devices and controllers, and the like. BMC 150 and USB-C power delivery controller 160 represent portions of a management system of information handling system 100 that provides management and control of the hardware, firmware, and software of the information handling system, and may include additional elements as needed or desired.

The inclusion of USB-C port 140 provides information handling system 100 with great flexibility. For example, USB-C 140 port is functionally compatible with legacy USB and USB2 devices, USB3 devices (10 Gbit/s and 20 Gbits), USB4 devices (20 Gbit/s and 40 Gbit/s), tunneled DisplayPort and PCIe devices, operates in Thunderbolt Alternate mode and DisplayPort Alternate mode, and provides for power transfers to and from the connected device, depending upon the nature of the device connected to the USB-C port. In particular, when a device is plugged in to USB-C port 140, USB-C PD controller 160 operates to negotiate the connection features with the connected device, and sets up information handling system 100 to operate compatibly with the connected device.

Further, information handling system 100 is configured to support alternate modes for driving USB-C port 140. In particular, retimer 130 includes a multiplexor 132 that permits USB-C port 140 to be driven by one of GPU 110 and by CPU 120. Here, USB-C PD controller 160 operates to drive multiplexor 132 to select one of the inputs from GPU 110 and CPU 120 based upon the selected connection mode of USB-C port 140. GPU 110 may be understood to provide two-lane or four-lane DisplayPort output (DP x2 or DP x4), and CPU 120 may be understood to provide a USB4/

Thunderbolt output. In this way, information handling system 100 operates to optimize the utilization of USB-C port 140.

For example where greater video processing performance is needed or desired, such as in a gaming or CAD application, providing the DP x2 or DP x4 output from GPU 110 for video data may be more desirable than providing the USB4/Thunderbolt output from CPU 120. Where greater data throughput is needed or desired, such as in a streaming application, providing the USB4/Thunderbolt output may be more desirable than the DP x2 output. Here USB-C PD controller 160 selects the appropriate output connection to provide to USB-C port 140, based upon the current workload instantiated on information handling system 100. In a particular embodiment, CPU 120 determines the output to be selected by USB-C PD controller 160, and communicates the determination via an I2C interface, or BMC 150 determines the output to be selected by the USB-C PD controller, as needed or desired.

Typically, a USB-C PD controller similar to USB-C PD controller 160 operates to implement a fixed prioritization of the connection states of a USB-C port. For example, a USB-C PD controller may prioritize establishing a Thunderbolt connection state whenever the connected device supports a Thunderbolt connection, may prioritize establishing a DisplayPort Alt Mode connections state when the connected device does not support a Thunderbolt connection but does support a DisplayPort Alt Mode connection, and so on. It has been understood by the inventors of the current disclosure that, with the increasing bandwidth limits of the various USB-C connections, there may be some lower priority connection states that actually provide enhanced performance over the higher priority connection states.

For example, the DisplayPort 2.0 standard is expected to require Ultra-High Bit Rate 20 (UHBR20) functionality at 20 Gbit/s. It may be desirable to establish a DP 2.0 Alt Mode connections, which supports DP x2 (40 Gbit/s graphics bandwidth) along with USB (10 Gbit/s bi-directional data bandwidth), rather than defaulting to a USB4/Thunderbolt connection (40 Gbit/s bi-directional data bandwidth), particularly where better graphics performance is desired. However, if USB-C PD controller 160 utilized a fixed prioritization of connection modes, the USB-C PD controller would not be expected to select a DP 2.0 Alt Mode connection over a USB4 connection.

It will be understood that, in typical information handling systems, the CPU will include an integrated USB4/Thunderbolt controller and an external retimer, but does not typically provide a discrete GPU input path. Here, retimer 130 includes multiplexor 132 to selectably switch either GPU 110 or CPU 120 to USB-C port 140. In this way, the USB-C graphics may come from either the USB4/Thunderbolt controller integrated with CPU 120, or from GPU 110. When USB-C PD controller 160 selects the DisplayPort Alt-Mode connection, the USB4/Thunderbolt functionality will be provided by CPU 120, and the DisplayPort functionality will be provided by GPU 110.

In a particular embodiment, USB-C PD controller 160 includes connections registers 164 that are utilized by CPU 120. Connection registers 164 include primary registers 166 that are utilized by whichever device is providing the data at the moment (CPU 120 for USB4/Thunderbolt transactions or GPU 110 for DisplayPort transactions), and shadow registers 168 that are utilized for USB4/Thunderbolt transactions when GPU 110 is enabled for DisplayPort transactions. In particular, when a device connected to USB-C port 140 generates a USB4/Thunderbolt event, or when CPU 120 initiates a USB4/Thunderbolt transaction, primary registers 166 are utilized to provide status information and control information related to the events and transactions. Here, the configuration of the information contained in primary registers 166 will set up the operating parameters of the USB4/Thunderbolt connection mode and provide transaction status information as needed by CPU 120 to respond to the events or execute the transactions. As such, the location and content of primary registers 166 will be defined by the USB4/Thunderbolt firmware associated with the particular CPU manufacturer, and will be located at a specified location within USB-C PD controller 160 as defined by the controller manufacturer.

A problem may exist in that, when a device connected to USB-C port 140 generates a DisplayPort event, or when GPU 110 initiates a DisplayPort transaction, the status and control information contained in primary registers 166, being loaded with information related to the USB4/Thunderbolt connection, will need to be overwritten with values associated with the DisplayPort connection. In this case, USB-C PD controller 160 may need to perform complex substitution operations, and track incoming events and transactions, switching values in the primary registers, depending upon whether the incoming events and transactions are related to the USB4/Thunderbolt connection or the DisplayPort connection. Moreover, such substitution operation may miss time critical event transitions on one connection while the other connection's information is loaded into primary registers 166. Thus, it can be seen that maintaining a single set of registers is cumbersome and error prone.

For this reason, connection registers 164 include shadow registers 168 that are dedicated to the use in the USB4/Thunderbolt connection mode. Here, when a device connected to USB-C port 140 generates a DisplayPort event, or when GPU 110 initiates a DisplayPort transaction, USB-C PD controller 160 operates to copy the information stored in primary registers 166 (i.e, the USB4/Thunderbolt associated information) to shadow registers 168 and primary registers 166 are utilized to provide status information and control information related to the DisplayPort events and transactions. Here, the configuration of the information contained in primary registers 166 will overwritten to set up the operating parameters of the DisplayPort connection mode and provide transaction status information as needed by CPU 120 to respond to the events or execute the transactions. As such, the location and content of shadow registers 168 will be defined by the manufacturer of USB-C PD controller 160. Subsequently, when an event or transaction is received, a determination is made as to whether or not the transaction or event is a USB4/Thunderbolt transaction or event, or is a DisplayPort transaction or event, and USB-C PD controller 160 directs register accesses to the associated register based upon the determination. Thus, when the received transaction or event is a DisplayPort transaction or event, accesses to connection registers 164 are directed to primary registers 166, and when the received transaction or event is a USB4/Thunderbolt transaction or event, accesses to the connection registers are directed to shadow registers 168. In particular, it will be understood that all accesses to connection registers 164 will be received from CPU 120 over, for example, an I2C interface, regardless of whether the accesses are related to USB4/Thunderbolt mode or to DisplayPort Alt mode. Thus it will be further understood that the location of primary registers 166 will be coded into the CPU firmware. In this case, accesses to primary registers 166 that are associated with DisplayPort transactions or events will be permitted to access the primary registers, while access to the primary registers that are associated with USB4/Thunderbolt transactions or events will be redirected to shadow registers 168 by USB-C PD controller 160. In this way, the hardware and firmware development paths for the USB4/Thunderbolt functionality in CPU 120 is separated from the development paths for the DisplayPort functionality in GPU 110.

Figure 2:
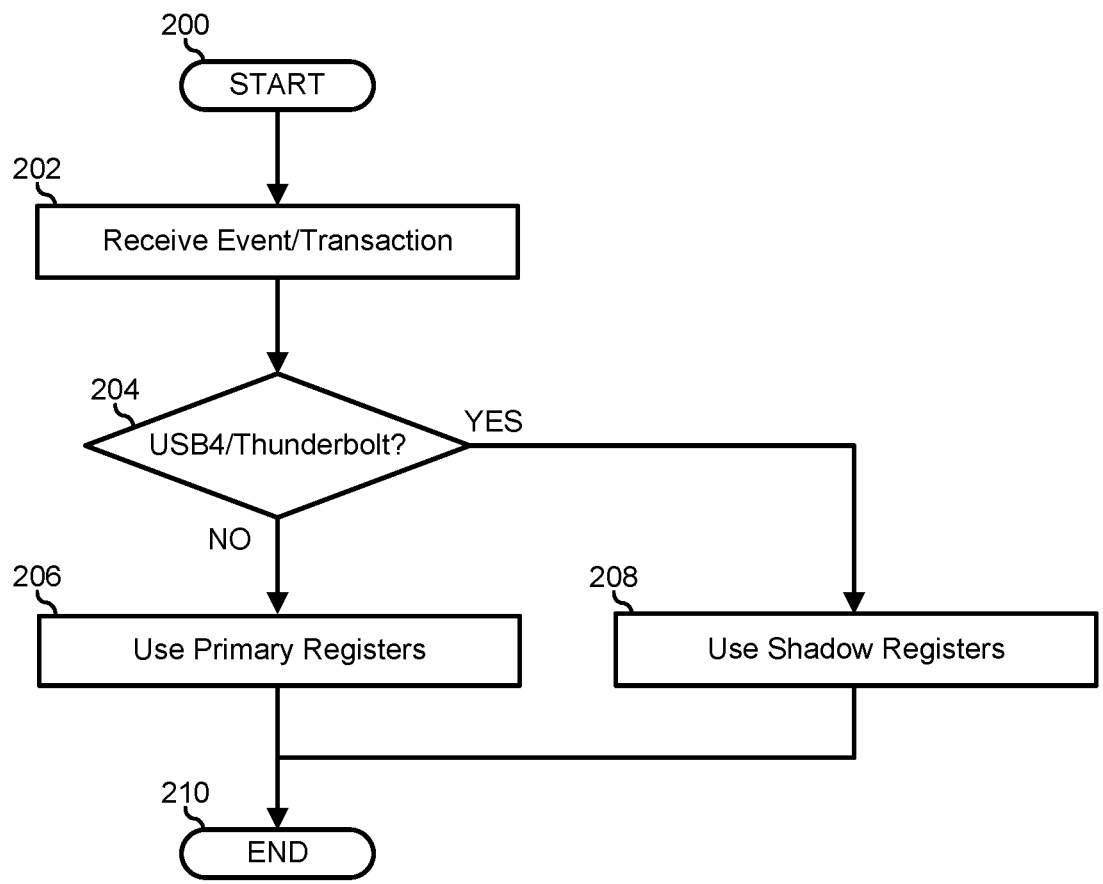
FIG. 2 is a flow chart illustrating a method for controlling a Thunderbolt/DisplayPort multiplexor according to an embodiment of the current disclosure.

FIG. 2 illustrates a method for controlling a Thunderbolt/DisplayPort multiplexor for discrete graphics Alt-Mode processing, starting at block 200. An event is received at a USB-C port or a transaction is provided to the USB-C port in block 202. A decision is made as to whether or not the event or transaction is a USB4/Thunderbolt event or transaction in decision block 204. If not, the "NO" branch of decision block 204 is taken, a set of primary registers is utilized to determine status and to control the event or transaction in block 206, and the method ends in block 210. If the event or transaction is a USB4/Thunderbolt event or transaction, the "YES" branch of decision block 204 is taken, a set of shadow registers is utilized to determine status and to control the event or transaction in block 208, and the method ends in block 210.

Figure 3:
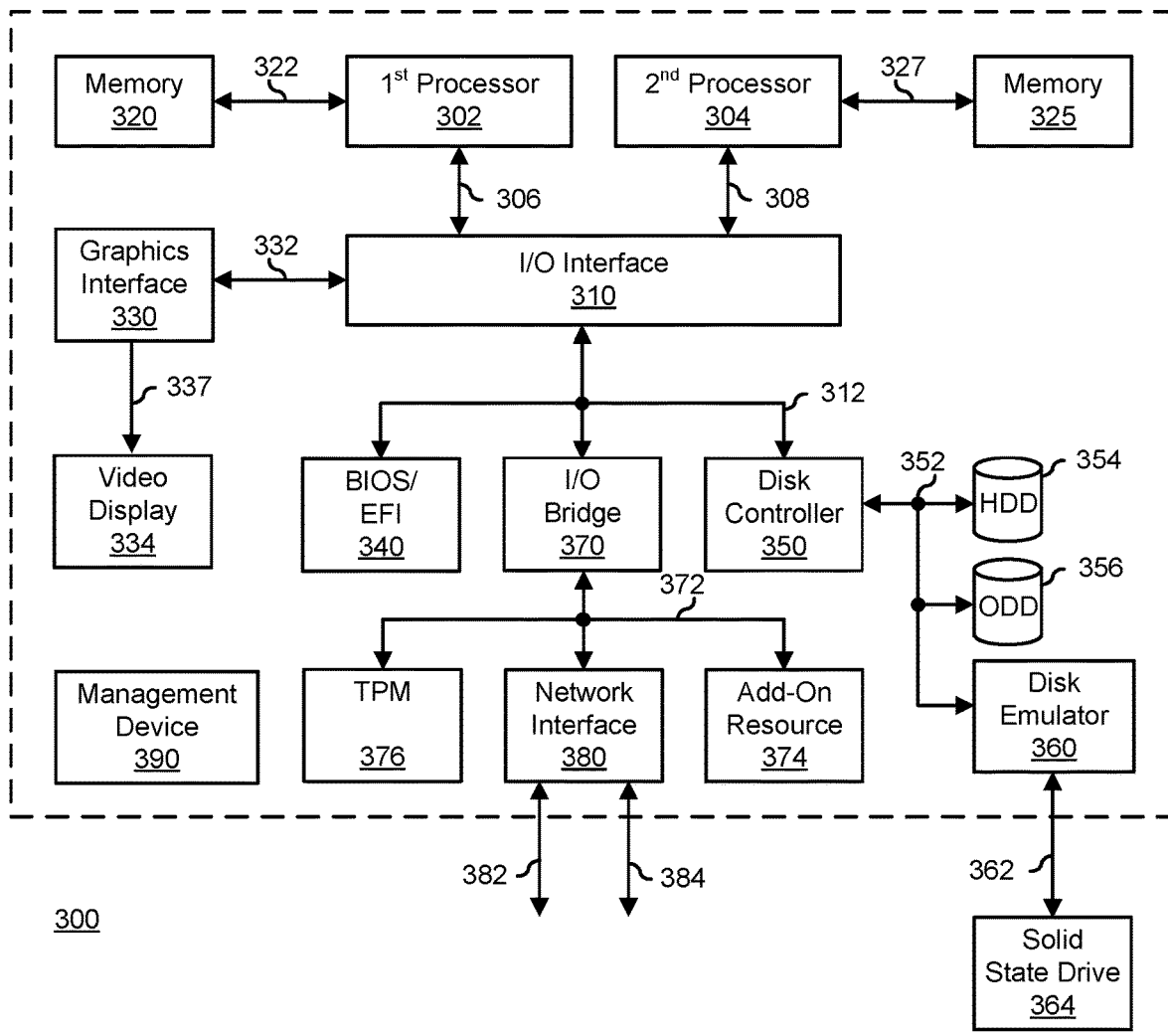
FIG. 3 is a block diagram illustrating a generalized information handling system according to another embodiment of the current disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 464 to be connected to information handling system 300 via an external interface 362. An example of external interface 362 includes a USB interface, an IEEE 1394 (Firewire) interface, a proprietary interface, or a combination thereof. Alternatively, solid-state drive 464 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a USB-C port;
   a first processor configured to couple to the USB-C port utilizing a USB/Thunderbolt connection type;
   a second processor configured to couple to the USB-C port utilizing a DisplayPort connection type;
   a USB-C power delivery controller including first registers and second registers, wherein, at a first time the first processor utilizes only the first registers to communicate with the USB-C port, and at a second time the USB-C power delivery controller shadows the contents of the first registers to the second registers and the second processor utilizes only the first registers to communicate with the USB-C port; and
   a retimer including a multiplexor configured to selectably couple one of the first processor and the second processor to the USB-C port;
   wherein when an event is associated with the USB/Thunderbolt connection type, the USB-C power delivery controller is further configured to select the first processor, and when the event is associated with the DisplayPort connection type, the USB-C power delivery controller is further configured to select the second processor.

2. The information handling system of claim 1, wherein the first registers include first command information and first status information, and wherein the second registers include second command and second status information.

3. The information handling system of claim 2, wherein the USB-C power delivery controller is configured to receive the event from a device coupled to the USB-C port, and to determine whether the event is associated with the USB/Thunderbolt connection type or with the DisplayPort connection type.

4. The information handling system of claim 3, wherein, when the event is associated with the USB/Thunderbolt connection type, the USB-C power delivery controller is further configured to provide the event to the first processor.

5. The information handling system of claim 4, wherein, when the event is associated with the DisplayPort connection type, the USB-C power delivery controller is further configured to provide the event to the second processor.

6. The information handling system of claim 1, wherein the first processor is a general purpose processor.

7. The information handling system of claim 6, wherein the second processor is a graphics processor.

8. A method, comprising:
providing, in an information handling system, a USB-C port;
selectably coupling a first processor of the information handling system to the USB-C port utilizing a USB/Thunderbolt connection type;
selectably coupling a second processor of the information handling system to the USB-C port utilizing a DisplayPort connection type;
providing, in a USB-C power delivery controller of the information handling system, first registers and second registers;
utilizing, at a first time, only the first registers by the first processor to communicate with the USB-C port;
shadowing, by the USB-C power delivery controller, contents of the first registers to the second registers;
utilizing, at the second time, only the first registers by the second processor to communicate with the USB-C port; and
wherein:
when an event is associated with the USB/Thunderbolt connection type, the method further comprises selecting, by the USB-C power delivery controller, a first input to a multiplexor of a retimer of the information handling system to couple the first processor to the USB-C port; and
when the event is associated with the DisplayPort connection type, the method further comprises selecting, by the USB-C power delivery controller, a second input to the multiplexor to couple the second processor to the USB-C port.

9. The method of claim 8, wherein the first registers include first command information and first status information, and wherein the second registers include second command and second status information.

10. The method of claim 9, further comprising:
receiving, by the USB-C power delivery controller, the event from a device coupled to the USB-C port; and
determining whether the event is associated with the USB/Thunderbolt connection type or with the DisplayPort connection type.

11. The method of claim 10, wherein, when the event is associated with the USB/Thunderbolt connection type, the method further comprises:
providing, by the USB-C power delivery controller, the event to the first processor.

12. The method of claim 11, wherein, when the event is associated with the DisplayPort connection type, the method further comprises:
providing, by the USB-C power delivery controller, the event to the second processor.

13. The method of claim 8, wherein the first processor is a general purpose processor.

14. The method of claim 13, wherein the second processor is a graphics processor.

15. An information handling system, comprising:
a USB-C port;
a general purpose processor configured to couple to the USB-C port utilizing a USB/Thunderbolt connection;
a graphics processor configured to couple to the USB-C port utilizing a DisplayPort connection;
a USB-C power delivery controller including first registers and second registers, wherein, at a first time the general purpose processor utilizes only the first registers to communicate with the USB-C port, and at a second time the USB-C power delivery controller shadows the contents of the first registers to the second registers and the graphics processor utilizes only the first registers to communicate with the USB-C port, the USB-C power delivery controller having an Inter-Integrated Circuit (I2C) interface; and
a retimer including a multiplexor configured to selectably couple one of the general purpose processor and the graphics processor to the USB-C port;
a baseboard management controller coupled to the I2C interface to program the first registers and the second registers;
wherein when an event is associated with the USB/Thunderbolt connection, the USB-C power delivery controller is further configured to select the general purpose processor, and when the event is associated with the DisplayPort connection, the USB-C power delivery controller is further configured to select the graphics processor.

16. The information handling system of claim 1, wherein the first registers and the second registers are programmed via an Inter-Integrated Circuit (I2C) interface.

17. The method of claim 8, further comprising:
programming the first registers via an Inter-Integrated Circuit (I2C) interface utilizing prior to the first time; and
programming the second registers via the I2C interface utilizing prior to the second time.

* * * * *